US010641627B2

(12) United States Patent
Rovner et al.

(10) Patent No.: US 10,641,627 B2
(45) Date of Patent: May 5, 2020

(54) MAGNETIC FLOWMETER WITH AUTOMATIC OPERATING SETPOINT SELECTION

(71) Applicant: Rosemount Inc., Chanhassen, MN (US)

(72) Inventors: Bruce D. Rovner, Minneapolis, MN (US); Scot Ronald Foss, Eden Prairie, MN (US); Steven B. Rogers, Minnetonka, MN (US)

(73) Assignee: Rosemount Inc., Shakopee, MN (US)

( * ) Notice: Subject to any disclaimer, the term of this patent is extended or adjusted under 35 U.S.C. 154(b) by 1697 days.

(21) Appl. No.: 14/136,955

(22) Filed: Dec. 20, 2013

(65) Prior Publication Data
US 2015/0177035 A1    Jun. 25, 2015

(51) Int. Cl.
| | | |
|---|---|---|
| G01F 1/58 | (2006.01) | |
| G05B 13/00 | (2006.01) | |
| G01D 21/00 | (2006.01) | |
| G06F 17/40 | (2006.01) | |
| G06F 19/00 | (2011.01) | |
| G01F 25/00 | (2006.01) | |
| G01F 1/60 | (2006.01) | |

(52) U.S. Cl.
CPC .............. *G01F 1/584* (2013.01); *G01F 1/58* (2013.01); *G01F 1/60* (2013.01); *G01F 25/0007* (2013.01); *G01D 21/00* (2013.01); *G05B 13/00* (2013.01); *G06F 17/40* (2013.01); *G06F 19/00* (2013.01)

(58) Field of Classification Search
None
See application file for complete search history.

(56) References Cited

U.S. PATENT DOCUMENTS

| | | | | |
|---|---|---|---|---|
| 3,002,383 A | * | 10/1961 | Mittelmann | G01F 1/58 310/11 |
| 3,006,188 A | * | 10/1961 | Handel | G01F 1/58 324/204 |
| 3,101,615 A | * | 8/1963 | Pavone | G01F 1/10 324/173 |
| 3,977,246 A | * | 8/1976 | Watanabe | G01F 1/58 73/861.12 |
| 3,996,797 A | * | 12/1976 | Torimaru | G01F 1/60 73/861.16 |
| 4,019,385 A | * | 4/1977 | Watanabe | G01F 1/58 73/861.12 |
| 4,651,286 A | | 3/1987 | Fukai et al. | |
| 4,658,653 A | | 4/1987 | Tomita | |
| 4,663,976 A | * | 5/1987 | Suzuki | G01F 1/60 361/154 |

(Continued)

FOREIGN PATENT DOCUMENTS

| | | | |
|---|---|---|---|
| CN | 101263367 A | | 9/2008 |
| CN | 102388532 | * | 2/2009 |

(Continued)

OTHER PUBLICATIONS

International Preliminary Report on Patentability for PCT/US2014/051075, dated Jun. 21, 2016, 6 pages.

(Continued)

*Primary Examiner* — Lisa E Peters
(74) *Attorney, Agent, or Firm* — Kinney & Lange, P.A.

(57) ABSTRACT

A magnetic flowmeter includes a flowtube with electrodes and field coil and a transmitter that automatically determines an operating setpoint for the magnetic flowmeter based upon sensed coil inductance, sensed coil resistance, a power rating for the transmitter, the flowtube, or both, and selected performance criteria.

25 Claims, 3 Drawing Sheets

(56) References Cited

U.S. PATENT DOCUMENTS

| | | | | |
|---|---|---|---|---|
| 5,090,250 | A | * | 2/1992 | Wada .................. G01F 1/60 |
| | | | | 73/861.12 |
| 5,133,644 | A | * | 7/1992 | Barr .................. F04B 49/065 |
| | | | | 417/218 |
| 5,621,177 | A | | 4/1997 | Torimaru |
| 6,237,424 | B1 | | 5/2001 | Salmasi et al. |
| 7,197,408 | B2 | | 3/2007 | Ferreira et al. |
| 7,516,023 | B2 | | 4/2009 | Ferreira et al. |
| 7,688,057 | B2 | | 3/2010 | Foss et al. |
| 2006/0095217 | A1 | * | 5/2006 | Coursolle .................. G01F 1/58 |
| | | | | 702/49 |
| 2008/0282766 | A1 | * | 11/2008 | Ishikawa .................. G01F 1/60 |
| | | | | 73/1.88 |
| 2009/0015236 | A1 | * | 1/2009 | Foss .................. G01F 1/60 |
| | | | | 324/76.11 |
| 2010/0024568 | A1 | * | 2/2010 | Diederichs .................. G01F 1/584 |
| | | | | 73/861.12 |
| 2013/0201316 | A1 | * | 8/2013 | Binder .................. H04L 67/12 |
| | | | | 348/77 |
| 2014/0083199 | A1 | * | 3/2014 | Rogers .................. G01F 1/588 |
| | | | | 73/861.12 |

FOREIGN PATENT DOCUMENTS

| | | | |
|---|---|---|---|
| CN | 101688798 | A | 3/2010 |
| CN | 102105766 | A | 6/2011 |
| CN | 102203569 | A | 9/2011 |
| CN | 102365530 | A | 2/2012 |
| CN | 102410847 | A | 4/2012 |
| CN | 102853869 | A | 1/2013 |
| CN | 203349879 | U | 12/2013 |
| CN | 204142302 | U | 2/2015 |
| JP | H04318424 | A | 11/1992 |
| JP | H06137889 | A | 5/1994 |
| JP | H07324959 | A | 12/1995 |
| JP | H08105774 | A | 4/1996 |
| JP | 2002340638 | A | 11/2002 |
| JP | 2004325208 | A | 11/2004 |
| JP | 2010533295 | A | 10/2010 |
| JP | 2012526279 | A | 10/2012 |
| WO | 2008042290 | A3 | 4/2008 |
| WO | 2009008974 | A1 | 1/2009 |
| WO | 2009154110 | A1 | 12/2009 |

OTHER PUBLICATIONS

International Search Report and Written Opinion, dated Nov. 26, 2014, for PCT Application No. PCT/US2014/051075, 9 pages.
First Japanese Office Action, for Japanese Patent Application No. 2016-539986, dated Mar. 28, 2018, 7 pages.
First Chinese Office Action dated Jul. 2, 2018, for corresponding Chinese Application No. 201410441382.1.
Extended European Search Report dated Dec. 12, 2019, received for corresponding European Application No. 14870970.2, 6 pages.

* cited by examiner

MAGNETIC FLOWMETER WITH AUTOMATIC OPERATING SETPOINT SELECTION

BACKGROUND

Magnetic flowmeters (or magmeters) measure flow by Faraday induction, an electromagnetic effect. The magnetic flowmeter typically includes a flowtube and a transmitter. The flowtube includes a pipe, a field coil (which may include multiple coils) mounted on the pipe, and electrodes that extend through the pipe. The transmitter energizes the field coil to generate a magnetic field across a pipe section, and the magnetic field induces an electromotive force (EMF) across the process flow. The resulting potential difference (or voltage) is sensed using a pair of electrodes that extend through the pipe section and into contact with the process flow, or via capacitive coupling. The flow velocity is proportional to the induced EMF, and the volumetric flow rate is proportional to the flow velocity and flow cross-sectional area. The transmitter receives the sensed voltage from the electrodes and produces a signal representing measured flow.

In general, electromagnetic flow measurement techniques are applicable to water-based fluids, ionic solutions and other conducting flows. Specific uses include water treatment facilities, high-purity pharmaceutical manufacturing, hygienic food and beverage production, and chemical processing, including hazardous and corrosive process flows. Magnetic flowmeters are also employed in the hydrocarbon fuel industry, including hydraulic fracturing techniques utilizing abrasive and corrosive slurries, and in other hydrocarbon extraction and processing methods.

Magnetic flowmeters provide fast, accurate flow measurements in applications where differential pressure-based techniques are disfavored because of the associated permanent pressure loss (for example, across an orifice plate or Venturi tube). Magnetic flowmeters can also be used when it is difficult or impractical to introduce a mechanical element into the process flow, such as a turbine rotor, vortex-shedding element or Pitot tube.

Some magnetic flowmeters use a field coil driven directly by AC line power. Another type of magnetic flowmeter, commonly referred to as a pulsed DC magnetic flowmeter, excites or powers the field coil periodically with a low frequency square wave. Pulsed DC magnetic flowmeters utilize a magnetic field which changes direction at a frequency determined by the square wave excitation.

In magnetic flowmeters, the coil current and the number of windings of the field coil determine strength of the magnetic field perpendicular to the conductive process fluid flowing through the flowtube. The flow rate of the process fluid cutting across this magnetic field produces a small potential on the electrodes exposed to the process fluid. The signal produced on the electrodes is directly (linearly) proportional to flow rate for a given number of windings (turns) and the given coil current in the windings.

At a given flow rate, the typical noise spectrum produced by fluid flow through a magnetic flowmeter exhibits a magnitude proportional to 1/frequency (often referred to as "1/f noise" or "pink noise"). The noise level also increases with higher flow velocities. It is often advantageous, therefore, for magnetic flowmeters to be able to operate at a higher excitation frequency in order to improve signal-to-noise ratio. It is also desirable to be able to operate at a higher coil current in order to improve signal-to-noise ratio, because the signal level produced at the electrodes of the magnetic flowmeter is directly proportional to amp turns of the field coil (i.e., the product of the coil current in amps times the number of windings or turns of the field coil).

In pulsed DC magnetic flowmeters, the magnetic field changes direction at the excitation frequency. When the magnetic field changes direction, a spike in the voltage sensed by the electrodes is created by the rapidly changing magnetic field. In order to make a flow measurement, the electrode voltage measurement circuitry of the flowmeter must wait until the electrode voltage spike settles before making a measurement. Another source of potential error is that if the current in the coils has not stabilized, or if changes in the magnetic field lag behind the current and are still slowly changing, the resulting voltage coupled into the electrode signal will appear as an erroneous flow reading. At some maximum frequency, the coil drive circuit is unable to get the coil current or the magnetic flux density to settle, and consequently the changing coil current induces changes in the electrode voltage which are not related to flow. Operating above that maximum excitation frequency will cause accuracy and repeatability of the flow measurement to suffer. An unsettled current drive reduces the zero accuracy of the flow measurement.

The rate at which the coil current settles is different for flowtubes of different diameters and constructions. A smaller diameter flowtube can be operated at higher excitation frequency than a larger diameter flowtube, because coil current will settle more rapidly with a smaller diameter flowtube. Additionally, the magnetic and electrical properties of some materials used for flowtube construction may cause the magnetic flux density to lag behind the current in the coils. This is especially important for coils operating at higher frequencies.

The primary influences on the drive current waveform are the inductance and resistance of the field coil together with the leads between the coil drive circuitry and the flowtube. Magnetic flowtubes have a wide variety of different inductance and resistance values, depending on flow diameter and vendor. Different installations of the same flowtube may have sensor resistance that varies by more than a factor of two, depending upon the amount of resistance in the wires used to connect the transmitter to the flowtube. Even within a single vendor's product line, there may not be a direct relationship between inductance of the field coil and the flow diameter of the flowtube. New flowtubes, as well as design changes in existing models of flowtubes can result in different coil inductance and resistance values that were not available when a particular transmitter was manufactured.

As a result, determination of an appropriate operating point for a particular flowtube and transmitter combination can be difficult. An optimal setpoint for operating current and frequency generally cannot be predetermined.

SUMMARY

A magnetic flowmeter includes a flowtube together with a transmitter that provides excitation to the flowtube based upon an operating setpoint. The transmitter automatically determines the operating setpoint based upon field coil resistance, field coil inductance, a power rating (of the transmitter, the flowtube, or both), and a performance criteria selection. The transmitter provides excitation to the flowtube based upon the determined operating setpoint, and provides a flow measurement based upon sensed voltage signals produced by the flowtube.

DETAILED DESCRIPTION

Figure 1:
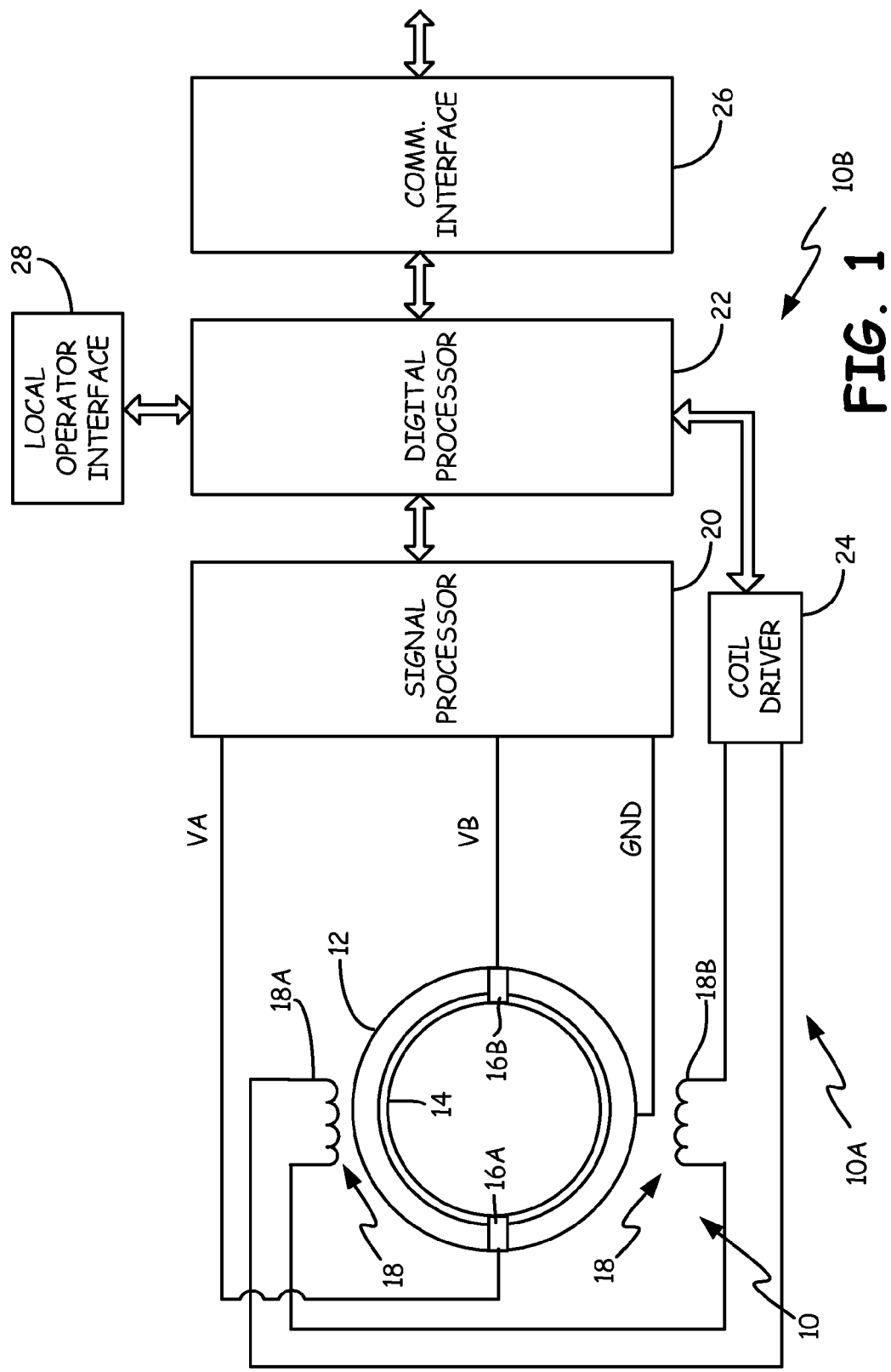
FIG. 1 is a block diagram of a magnetic flowmeter.

FIG. 1 shows an exemplary magnetic flowmeter 10, which includes primary section (flowtube or sensor) 10A and secondary section (transmitter) 10B. Flowtube 10A includes pipe 12, insulating liner 14, electrodes 16A and 16B, and field coil 18 formed by series-connected coils 18A and 18B.

The primary function of flowtube 10A is to produce a voltage proportional to the velocity of the fluid being measured. Coils 18A and 18B are energized by passing a current through them to develop a magnetic field. In a pulsed DC magnetic flowmeter, the direction of the coil drive current is reversed periodically so that the magnetic field produced by coils 18A and 18B changes direction. The process fluid flowing through the interior of flow pipe 10A functions as a moving conductor such that the magnetic field induces a voltage in the fluid. Flush mounted electrodes 16A, 16B inside flowtube 10A are in direct electrical contact with the conductive process fluid, thereby picking up voltages present in the fluid. To prevent the voltage from being shorted, the fluid must be contained in an electrically insulating material. When pipe 12 is a metal tube, the electrical insulation is provided by liner 14, which is a non-conducting material such as polyurethane, polytetrafluoroethylene (PTFE), or another insulating material.

Transmitter 10B interprets the voltage generated at electrode 16A and 16B and transmits a standardized signal to a monitoring or control system. Secondary section 10B is commonly referred to as a transmitter or signal converter.

Transmitter 10B typically includes signal processor 20, digital processor 22, coil driver 24, communication interface 26, and local operator interface 28. Signal conversion, conditioning, and transmission are the principal functions of transmitter 10B.

Digital processor 22 controls the pulse frequency of the pulsed DC coil drive current supplied by coil driver 24 to coils 18A and 18B. The current waveform provided by coil driver 24 is a square wave having a frequency referred to as the pulse or excitation frequency. The square wave can have a variable duty cycle selected by digital processor 22.

Signal processor 20 is connected to electrodes 16A and 16B and to ground. The ground connection may be to pipe 12, or may be to a flange or pipe section upstream or downstream of pipe 12.

During the electrode voltage sampling period defined by digital processor 22, signal processor 20 monitors potential VA at electrode 16A and potential VB at electrode 16B. Signal processor 20 produces a voltage representing the difference in potential between electrode 16A and 16B and converts that voltage into a digital signal representing the electrode voltage during the electrode voltage sampling period. Digital processor 22 may perform further signal processing and filtering of the digital signals received from signal processor 20. Digital processor 22 supplies a flow measurement value to communication interface 26, which communicates that value to a monitoring or control system (not shown) which may be located at a control room. The communication by communication interface 26 can be in the form of an analog current level which varies between 4 and 20 mA; a HART® communication protocol in which digital information is modulated upon a 4-20 mA current; a communication protocol over a digital bus such as, for example, Fieldbus digital bus (IEC 61158); or wireless communication over a wireless network using a wireless protocol such as, for example, WirelessHART® wireless protocol (IEC 62951).

Flowmeter 10 provides an automatic method for selecting an operating setpoint representing the best combination of excitation frequency, coil drive current, and optionally coil drive duty cycle based upon the characteristics of flowtube 10A and the power ratings of flowtube 10A and transmitter 10B. This automatic selection of operating frequency, current, and duty cycle can be performed in the field at the time of installation, automatically on transmitter power up, or continuously in the background as flowtube 10A and transmitter 10B are in operation.

The automatic setpoint selection is performed by digital processor 22 based upon an algorithm that uses parameters as inputs together with a criteria selection made by the operator to determine a setpoint configuration for transmitter 10B on site at a specific installation. The parameters used as inputs can include coil inductance, coil resistance, flowtube gain (i.e., in millivolts output per amps of excitation current), flowtube power rating, transmitter power rating, and magnetic flux density. The criteria used by digital processor 22 can include, for example, fastest response, highest signal-to-noise ratio based on frequency, highest signal-to-noise ratio based upon accuracy, and power efficiency. An operator can select a criteria through local operator interface 28. The different choices of criteria to be used can be displayed at local operator interface 28, and a selection can be made and supplied as an input from the operator to digital processor 22. The criteria selection made by the operator may represent a single criterion, or a combination of two or more criteria.

The parameters include measured values of coil inductance and coil resistance, and optionally flowtube gain and/or magnetic flux density. These measured values may be measured automatically by transmitter 10B at the time of installation, at transmitter power up, or continuously during operation of flowmeter 10. Alternatively, the coil inductance, coil resistance, and flowtube gain values can be measured prior to installation (e.g., at the factory) and then provided as inputs to digital processor 22 through local operator interface 28 or from a configuration device (not shown) that is coupled to communication interface 26.

By allowing transmitter 10B to select a drive current frequency duty cycle operating setpoint based on gain of flowtube 10A and measured parameters of coil inductance and coil resistance, each installation can be tailored to the specific combination of flowtube 10A and transmitter 10B. Depending on the criteria selection made by the operator, transmitter 10B will tailor the drive current, drive frequency, and duty cycle setpoint to best achieve the desired criteria such as best signal-to-noise ratio, best power conservation, or best (fastest) response time, depending on the criteria selection made by the operator.

In addition to the parameters that have been discussed, additional inputs can be provided, such as coil current (or current stability), electrode noise, and electrode voltage shift characteristics. These additional inputs can enhance the capability of processor 22 in selecting an operating setpoint.

The automatic setpoint selection provides greater flexibility and better operating setpoint selection because the operating setpoint is selected based on the actual characteristics of flowtube 10A. Thus, if a new flowtube becomes available that has different characteristics (e.g., less inductance and more gain), digital processor 22 can select the operating setpoint based upon the characteristics of that new flowtube even though the new flowtube may not have been in existence at the time that transmitter 10B was manufactured.

The automatic setpoint selection also provides a wider range of choices of operating frequency and operating current. Rather than having only one or a limited number of operating current setpoint values and only a limited number of frequency setpoint values, the automatic setpoint selection provided by digital processor 22 can select from a larger number of combinations of different frequencies, current, and duty cycle setpoint values. This provides greater flexibility in combining transmitters with new flowtube designs having electrical parameters that are different than those previously on the market.

The automatic setpoint selection can operate in background as a continuous adjustment. This allows transmitter 10B to maintain optimal performance for the selected criteria during operation when environmental conditions may change. In particular, during operation, temperature changes can affect the resistance of both coils 18A, 18B and the cable that connects coil drive 24 to coils 18A, 18B.

The automatic setpoint selection also allows replacement of one flowtube for another as needed. Transmitter 10B will adapt to the new parameters associated with the replacement flowtube and once again select an operating setpoint based upon those parameters that will best meet the criteria selection provided by the operator.

In some cases, digital processor 22 can display to the operator, through local operator interface 28, alternative setpoint selections for the same criteria selection, or setpoint selections for each of a number of different possible criteria selections. This can allow the operator to make a criteria selection that will provide the performance desired for magnetic flowmeter 10.

For power sensitive installations, a minimum duty cycle can be determined that can be used for the most efficient operation. Power could be conserved down to the point where a minimum specified signal-to-noise ratio is present. This would mean that the power consumption could be reduced as process flow increases. Alternatively, when flow increases, faster updates could be made with the same amount of power. These adjustments can be made on an automatic basis by digital processor 22 operating continuously in background during operation of magnetic flowmeter 10.

Additional parameters can be used by digital processor 22 include electrode noise and zero shift of electrode voltage as a function of coil drive frequency. These inputs may factor into the selection of drive frequency setpoint.

Figure 2:
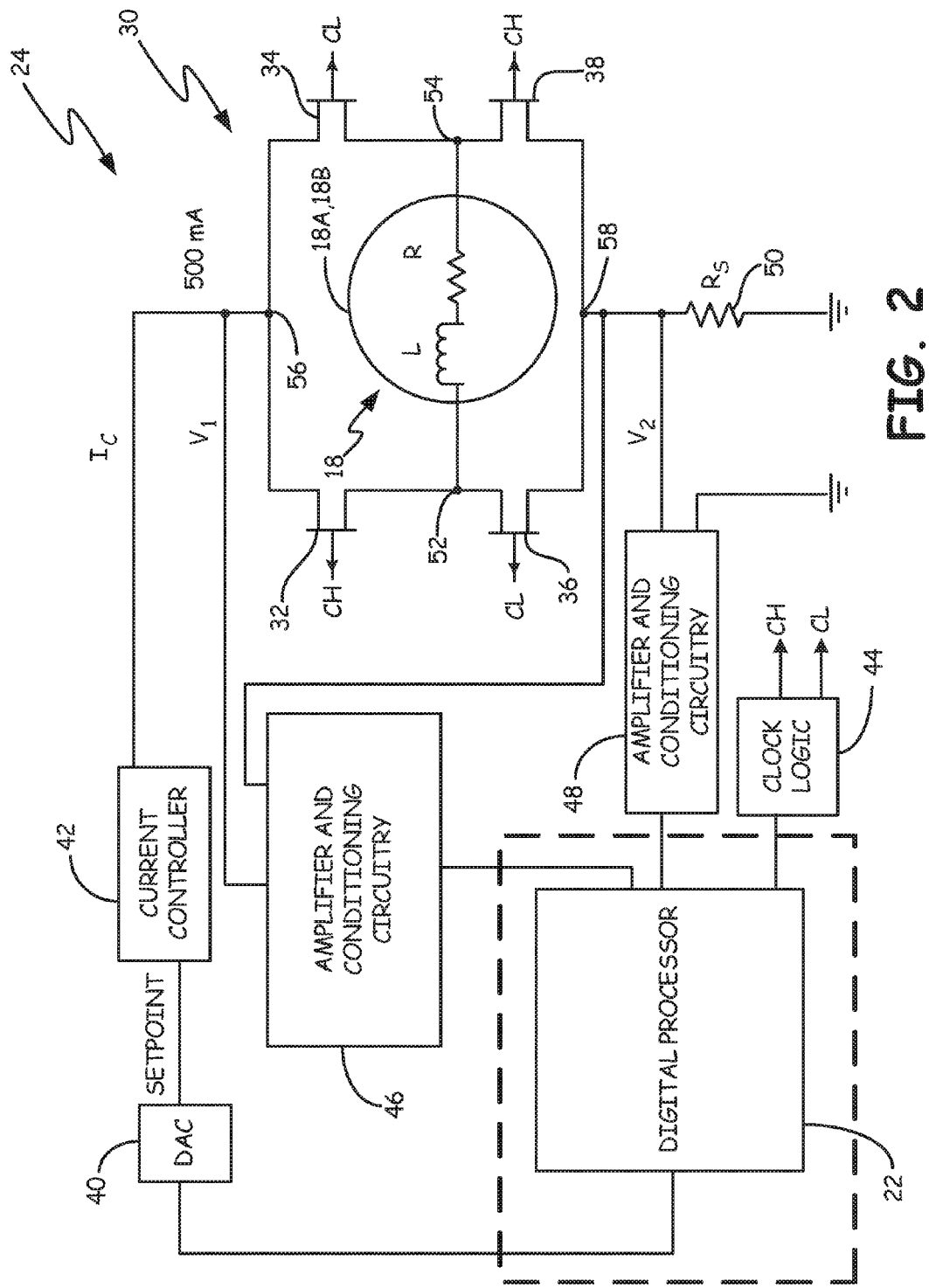
FIG. 2 is a block diagram showing coil driver and associated measurement circuitry for the magnetic flowmeter of FIG. 1.

FIG. 2 is a block diagram of coil driver 24, together with field coil 18 (coils 18A and 18B and digital processor 22. Coil driver 24 includes H-bridge 30 formed by field effect transistors 32, 34, 36, and 38, digital to analog converter (DAC) 40, current controller 42, clock logic 44, coil voltage amplifier and conditioning circuitry 46, coil current amplifier and conditioning circuitry 48, and sense resistor 50. Coils 18A and 18B that form field coil 18 are connected in series between nodes 52 and 54 of H-bridge 30. As shown in FIG. 2, coils 18A, 18B together present coil inductance L and coil resistance R between nodes 52 and 54.

Digital processor 22 controls the coil current setpoint, the pulse frequency and the duty cycle of the drive signal supplied through H-bridge 30 to coils 18A, 18B. The frequency and duty cycle of the drive signal is controlled by digital processor 22 through clock logic 44, which produces clock signals CH and CL. Clock signal CH turns transistors 32 and 38 of H-bridge 30 on and off. Clock signal CL turns transistors 34 and 36 of H-bridge on and off. When transistors 32 and 38 are turned on by clock signal CH and transistors 34 and 36 are turned off by clock signal CL, current flows from node 56 of H-bridge 30 through transistor 32 to node 52, through coils 18A, 18B in the first direction to node 54, through transistor 38 to node 58 of H-bridge 30, and through sense resistor 50 to ground. When clock signal CL turns transistors 34 and 36 on and clock signal CH turns transistors 32 and 38 off, current flows from node 56 of H-bridge 30 through transistor 34 to node 54, through coils 18A, 18B in a second direction to node 52, and through transistor 36, node 58 and sense resistor 50 to ground.

The current delivered to H-bridge 30 is controlled by digital processor 22 through DAC 40. A digital control signal from digital processor 22 causes DAC 40 to produce an analog voltage representing a setpoint current to the input of current controller 42. Coil current $I_C$, which is a function of the current setpoint signal supplied to current controller 42, flows from current controller 42 to node 56 of H-bridge 30 and then flows through coils 18A, 18B in either a first direction when transistors 32 and 38 are turned on or a second direction when transistors 34 and 36 are turned on. Coil current $I_C$ then flows through sense resistor 50 to ground.

Coil driver 24 includes amplifier and conditioning circuitry 46 to sense coil voltage, and amplifier and conditioning circuitry 48 to sense coil current. The inputs to amplifier and conditioning circuitry 46 are connected to nodes 56 and 58 of H-bridge 30. The output of amplifier and conditioning circuitry 46 is supplied to an input of an onboard analog-to-digital converter (ADC) of digital processor 22. The inputs of amplifier and conditioning circuitry 48 are connected to node 58 of H-bridge 30 and to ground. Voltage V2 at the input of amplifier and conditioning circuitry 48 is equal to coil current $I_C$ times resistance $R_S$ of sensor resistor 50, i.e., $V2=I_C R_S$.

Based upon signals received from amplifier and conditioning circuitry 46 and amplifier and conditioning circuitry 48, digital processor 22 produces digital values representing coil voltage $V_C$ and coil current $I_C$. With these values, digital processor 22 can determine coil resistance and coil inductance.

The power used by coils 18A, 18B can be calculated using coil current and coil voltage measurements by digital processor 22 in conjunction with amplifier and conditioning circuitry 46 and 48. Coil current $I_C=V2/R_S$. Coil voltage $V_C=V1-V2$. Once coil current $I_C$ and coil voltage $V_C$ are measured, resistance R of sensor coils 18A, 18B (including resistance of cabling that connects coil driver 24 with coils 18A and 18B) can be calculated by the following equation: $R=V_C/I_C$. The coil settling time of current along with resistance R can be used by digital processor 22 to calculate coil inductance L (which includes any inductance contributed by the cabling between coils 18A, 18B and coil driver 24).

Figure 3:
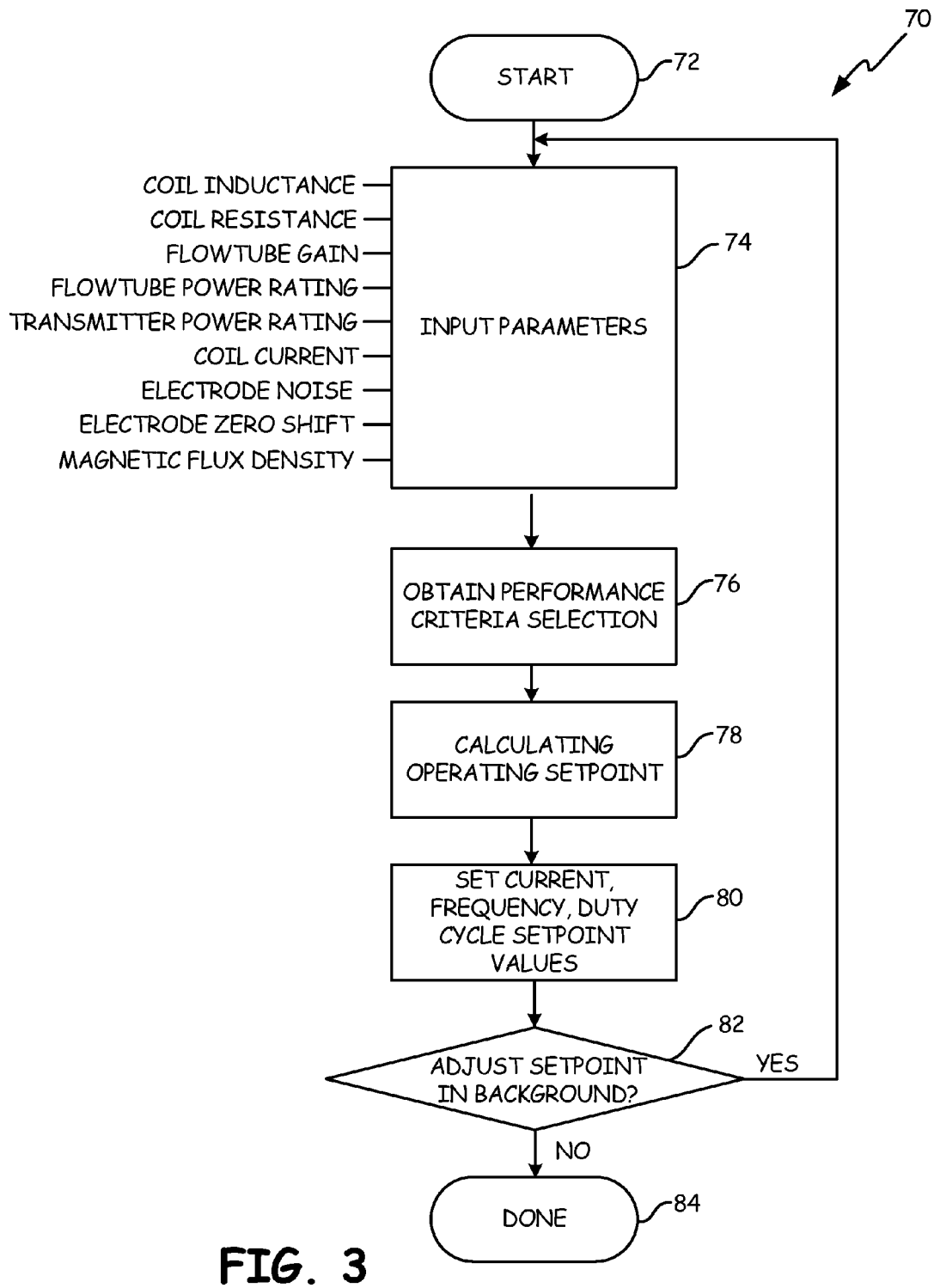
FIG. 3 is a flow diagram illustrating automatic setpoint selection by the transmitter.

FIG. 3 is a flow diagram illustrating automatic setpoint selection process 70 performed by digital processor 22. Process 70 begins at start up 72. Digital processor 22 obtains input parameters (step 74), which can include, for example, a coil inductance value, a coil resistance value, flowtube gain, flowtube power rating, transmitter power rating, coil current, electrode noise, magnetic flux density, and zero shift characteristics as a function of frequency.

The coil inductance and resistance values can be a result of measurements performed by digital processor 22 in conjunction with the circuitry of coil driver 24, or may be input values applied to digital processor 22 through local operator interface 28 or communication interface 26. Digital processor 22 can also initiate testing to measure flowtube gain, or to prompt the operator to supply a measured gain value through local operator interface 28 or by a message sent through communication interface 26.

Digital processor 22 may also prompt the operator to provide other parameters to use in setpoint selection, such as power rating of flowtube 10A, and power rating of transmitter 10B. In some cases, digital processor 22 may also prompt the operator to provide one or more of coil current, electrode noise, signal-to-noise ratio, and electrode voltage zero shift characteristics. Other parameters can also be obtained by measurement or operator input if needed in order to make use of particular criteria selections.

Digital processor 22 will prompt the operator to provide a criteria selection (step 76) that will be used in the automatic setpoint determination (step 78). These criteria selections may involve a choice of fastest response, highest signal-to-noise ratio for a particular frequency or for a particular desired accuracy, power efficiency based upon a particular desired signal-to-noise ratio, etc. The criteria selection may also include an option of continuous setpoint adjustment in background during operation of transmitter 10 or, alternatively, selection of an operating point to be used without continuous adjustment until the operator requests a new setpoint selection.

Based upon the parameters received and the criteria selection made by the operator, digital processor 22 calculates a selected setpoint for the coil drive frequency, current, and duty cycle (step 78). Digital processor 22 then sets the operating point coil frequency value, current value, and duty cycle value to be applied by coil drive 24 (step 80).

Digital processor 22 then checks whether the operator has chosen continuous adjustment in background (step 82). If the answer is no, then the automatic setpoint selection process is done (step 84). In that case, process 70 will not be repeated until the operator provides an input to digital processor 22 requesting a new setpoint selection. Process 70 can also be configured to restart each time transmitter 10B powers up following a period when it has been powered down.

If the answer is yes, then continuous adjustment of the operating setpoint will be performed by processor 22 in background. Process 70 returns to step 74, and steps 74-82 are repeated.

The automatic setpoint selection allows flowmeter 10 to take into account the characteristics of both flowtube 10A and transmitter 10B when determining an operating point for a given installation. The automatic setpoint selection can be achieved without adding additional operating overhead or adding sophisticated signal processing. Dramatic improvement in performance of some installations can be achieved by better matching the parameters of flowtube and transmitter with the particular performance criteria desired by the operator. The automatic setpoint selection allows transmitter 10B the capability of better matching this operation with flowtubes that were not in existence at the time transmitter 10B was manufactured.

The automatic setpoint selection can adjust coil current amplitude, coil current frequency, coil current duty cycle, or any combination of those parameters based on coil inductance, coil resistance, as well as a number of other parameters such as flowtube gain, signal-to-noise ratio data, power ratings of the transmitter and flowtube, current stability and electrode characteristics.

The coil drive operating setpoint is not dependent on sensor data known at the time of transmitter manufacture. It can be continually adjusted if desired to account for changing temperatures that can affect coil resistance.

The automatic setpoint selection simplifies configuration of the flowmeter for the operator, because it allows the operator to select the particular criteria to be used, and then digital processor automatically selects the setpoint based upon the characteristics of the flowmeter and the performance criteria chosen by the operator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A magnetic flowmeter comprising:
  a flowtube that includes:
    a pipe through which fluid flows;
    a field coil mounted on the pipe, the field coil characterized by a coil resistance and a coil inductance; and
    electrodes for sensing voltage induced by a magnetic field generated by the field coil in the fluid that flows through the pipe; and
  a transmitter configured to measure the coil resistance and the coil inductance of the field coil, the transmitter including:
    a coil driver for exciting the field coil using a pulsed DC current waveform characterized by an excitation frequency, a coil drive current, and a coil drive duty cycle so as to produce the magnetic field; and
    a processor for producing a flow measurement value as a function of the voltage sensed by the electrodes, and for determining an operating setpoint that defines the excitation frequency, the coil drive current, and the coil drive duty cycle, the processor determining the operating setpoint based on the measured coil resistance, and the measured coil inductance.

2. The magnetic flowmeter of claim 1, wherein the transmitter is further configured to measure magnetic flux density of the magnetic field, the processor determining the operating setpoint further based on the measured magnetic flux density.

3. The magnetic flowmeter of claim 1, wherein the transmitter is further configured to measure flowtube gain, the processor determining the operating setpoint further based on the measured flowtube gain.

4. The magnetic flowmeter of claim 1, wherein the transmitter is further configured to determine the operating setpoint by tailoring the drive current, drive frequency, and/or duty cycle setpoint to best achieve performance criteria including at least one of the group consisting of electrode noise, signal-to-noise ratio, and electrode voltage zero shift characteristics.

5. The magnetic flowmeter of claim 1, wherein the processor determines the operating setpoint further based on a power rating that comprises at least one of the group consisting of a flowtube power rating and a transmitter power rating.

6. The magnetic flowmeter of claim 1, wherein the processor determines the operating setpoint further based on performance criteria that comprise at least one of the group consisting of fastest response, highest signal-to-noise ratio for a particular excitation frequency, highest-signal-to-noise ratio for a particular accuracy, and power efficiency.

7. The magnetic flowmeter of claim 1, wherein the processor continuously adjusts the operating setpoint.

8. A magnetic flowmeter comprising:
   a flowtube having a coil for producing an alternating magnetic field and electrodes for sensing voltage induced by the alternating magnetic field in fluid flowing through the flowtube, the coil characterized by a coil resistance and a coil inductance;
   a coil driver connected to the coil to produce the alternating magnetic field using a pulsed DC current waveform characterized by a coil drive frequency and a current setpoint, the coil driver including circuitry for sensing the pulsed DC current waveform; and
   a processor that generates a flow output as a function of a sensed voltage between the electrodes, wherein the processor determines an operating setpoint that defines the coil drive frequency and the current setpoint, the processor determining the operating setpoint based on the coil resistance and the coil inductance as measured by the processor.

9. The magnetic flowmeter of claim 8, wherein the processor determines the operating setpoint further based on magnetic flux density as measured by the processor.

10. The magnetic flowmeter of claim 8, wherein the operating setpoint further includes a coil drive duty cycle.

11. The magnetic flowmeter of claim 8, wherein the processor further determines the operating setpoint based upon at least one of the group consisting of flowtube gain, coil current, electrode noise and electrode voltage zero shift characteristics.

12. The magnetic flowmeter of claim 8, wherein the processor determines the operating setpoint further based on a power rating that comprises at least one of the group consisting of a flowtube power rating and a transmitter power rating.

13. The magnetic flowmeter of claim 8, wherein the processor determines the operating setpoint further based on performance criteria that comprise at least one of the group consisting of fastest response, highest signal-to-noise ratio for a particular excitation frequency, highest-signal-to-noise ratio for a particular accuracy, and power efficiency.

14. A transmitter for use with a magnetic flowtube, the transmitter comprising:
   a coil driver for supplying a pulsed DC current waveform to a coil of the magnetic flowtube, the coil characterized by a coil resistance and a coil inductance, the pulsed DC current waveform characterized by an excitation frequency, and a coil drive current; and
   a processor for measuring the coil resistance and the coil inductance, the processor further configured to determine an operating setpoint based on the measured coil resistance, and the measured coil inductance, and to control operation of the coil driver based on the operating setpoint.

15. The transmitter of claim 14, wherein the operating setpoint is further characterized by a coil drive duty cycle.

16. The transmitter of claim 14, wherein the processor determines the operating setpoint further based on at least one of the group consisting of flowtube gain, coil current, electrode noise, signal-to-noise ratio, and electrode voltage zero shift characteristics.

17. The transmitter of claim 14, wherein the processor determines the operating setpoint further based on a power rating that comprises at least one of the group consisting of flowtube power rating and transmitter power rating.

18. The transmitter of claim 14, wherein the processor determines the operating setpoint further based on performance criteria that comprise at least one of the group consisting of fastest response, highest signal-to-noise ratio for a particular excitation frequency, highest-signal-to-noise ratio for a particular accuracy, and power efficiency.

19. The transmitter of claim 14, wherein the processor continuously adjusts the operating setpoint.

20. A method of controlling operation of a magnetic flowmeter, the method comprising:
   obtaining flowmeter parameters that include coil resistance, coil inductance, and a power rating;
   inputting a performance criteria selection;
   determining an operating setpoint that includes current and frequency setpoint values based upon the measured flowmeter parameters and the inputted performance criteria selection; and
   controlling field coil excitation of the magnetic flowmeter based on the determined operating setpoint.

21. The magnetic flowmeter of claim 20, wherein the determined operating setpoint further includes a coil drive duty cycle setpoint value.

22. The method of claim 20, wherein the flowmeter parameters further include at least one of the group consisting of flowtube gain, coil current, electrode noise, signal-to-noise ratio, and electrode voltage zero shift characteristics.

23. The method of claim 20, wherein the power rating comprises at least one of the group consisting of flowtube power rating and transmitter power rating.

24. The method of claim 20, wherein the performance criteria selection comprises at least one of the group consisting of fastest response, highest signal-to-noise ratio for a particular excitation frequency, highest-signal-to-noise ratio for a particular accuracy, and power efficiency.

25. The method of claim 20 and further comprising:
   adjusting the operating setpoint to account for changes in the flowmeter parameters during operation of the magnetic flowmeter.

* * * * *